United States Patent Office 3,506,034
Patented Apr. 14, 1970

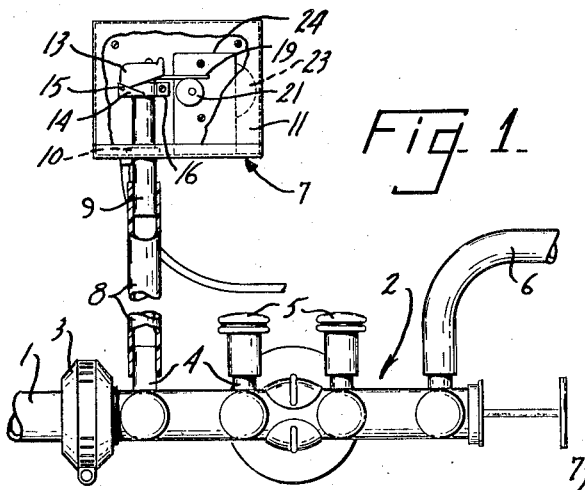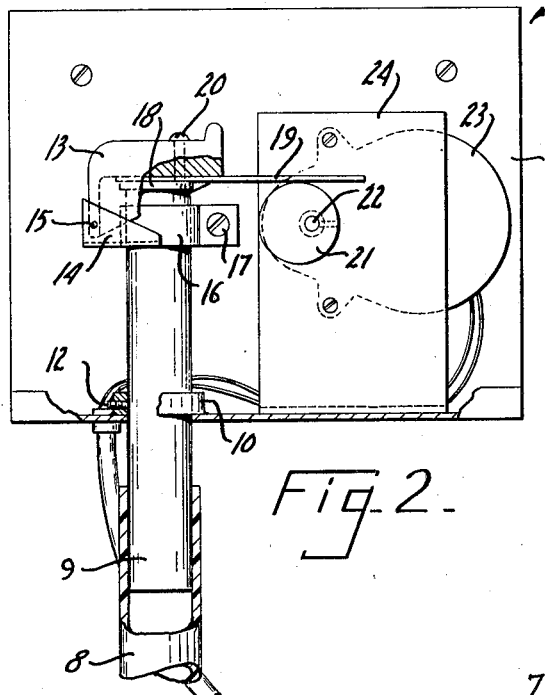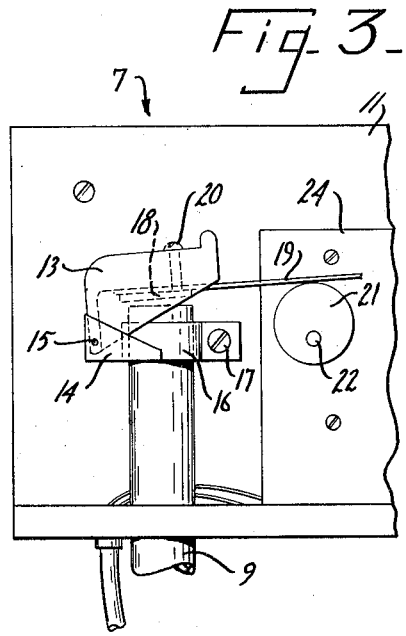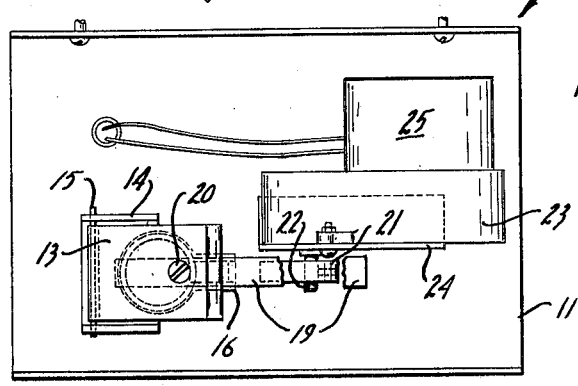

3,506,034
APPARATUS FOR INTRODUCING AIR INTO A VACUUM MILKING SYSTEM DURING THE WASHING CYCLE
Donald L. Branton, Delavan, Wis., assignor to Sta-Rite Industries, Inc., Delavan, Wis., a corporation of Wisconsin
Filed May 3, 1967, Ser. No. 635,716
Int. Cl. F17d 3/00
U.S. Cl. 137—624.17       3 Claims

ABSTRACT OF THE DISCLOSURE

The invention relates to an apparatus for introducing air into the pipeline of a vacuum milking system during the washing cycle. The apparatus includes a tubular member having one end connected to the pipeline and the opposite end defines a valve seat which is enclosed by a hinged valve cap. An arm extends outwardly from the valve cap and engages an eccentric. As the eccentric is rotated, the valve cap is raised and lowered to open and close the valve cap and intermittently introduce air into the pipeline. The introduction of air creates turbulence in the washing solution passing through the pipeline to increase the velocity of the solution and thereby increase the cleaning action.

---

The conventional pipeline milking system includes a pipeline which extends through the barn or other milking area and a vacuum is drawn on the pipeline by a vacuum pump. Individual milkers are connected at spaced locations to the pipeline and milk from each milker is drawn into the pipeline and conveyed through the pipeline to a bulk storage tank. After the milking operation has been completed, it is necessary to completely clean or sanitize all portions of the system which were contacted by the milk. To accomplish this sanitizing action, a wash tank is utilized which contains a washing or sanitizing solution, and the teat cups of the various milkers are suspended in the tank, with the outlet of each milker being connected to a manifold which is an integral part of the pipeline. By drawing a vacuum in the pipeline, the washing solution is drawn through the milkers, conveyed through the pipeline and is returned to the wash tank. With this arrangement, the milkers, as well as all of the other portions of the pipeline, are completely washed or sanitized.

It has been found that by intermittently introducing air into the pipeline during the washing cycle, a more effective cleaning action is obtained. The sudden entrance of slugs of air into the vacuum system creates turbulence in the solution passing through the pipeline, thereby increasing the relative velocity of the solution and providing a more effective cleaning action.

The present invention is directed to an apparatus for introducing air into the pipeline of a vacuum milking system during the washing or sanitizing cycle. The apparatus includes a tubular member having one end connected to the pipeline, and the opposite end defines a valve seat which is enclosed by a hinged valve cap. An arm extends outwardly from the valve cap and engages a cam or eccentric. As the eccentric rotates, the arm and valve cap are pivoted to alternately open and close the valve cap. When the valve cap opens, a slug of air is drawn into the pipeline and the air rushing into the pipeline increases the velocity and turbulence of the washing solution to provide an improved washing action.

The frequency of the opening and closing of the valve cap can be readily changed by changing the speed of the motor or by changing the shape of the eccentric or cam. For a given frequency, the amount of air which is introduced into the pipeline can be readily regulated by raising or lowering the tubular member and valve cap with respect to the eccentric. Movement of the tubular member with respect to the eccentric provides an adjustment for the relative proportion of open and closed time of the valve cap during each cycle, and this adjustment is important to the dairyman, for it enables the dairyman to regulate the amount of air introduced into the pipeline in order to obtain the optimum cleaning characteristics, depending on the capacity of the pump, the length of the pipeline, and other factors.

Other objects and advantages will appear in the course of the following description.

The drawings illustrate the best mode presently contemplated of carrying out the invention.

In the drawings:

FIG. 1 is a side elevation with parts broken away of the air injection apparatus as incorporated with a pipeline milking system;

FIG. 2 is an enlarged side elevation with parts broken away showing the air injection apparatus with the valve cap in the closed position;

FIG. 3 is a view similar to FIG. 2 showing the valve cap in the open position; and FIG. 4 is a plan view with parts broken away showing the air injection apparatus.

The drawings illustrate a pipeline 1 for a vacuum milking system, including a manifold 2 which is connected in the pipeline by a coupling 3. The manifold 2 includes a series of nipples 4 with a number of the nipples being enclosed by removable caps 5. One of the nipples 4 is engaged with a hose 6 which is connected to the outlet of an automatic milker. During the washing cycle, one or more milkers are suspended in the wash tank which contains a washing or sanitizing solution and each milker is connected by a hose 6 to one of the nipples 4 of manifold 2. While FIG. 1 shows only a single milker hose 6 connected to the manifold in practice, there may be several milker hoses connected to the manifold.

In accordance with the invention, an air injector 7 is connected to one of the nipples 4 of the manifold 2. The air injector 7 includes a pipe 8 which extends upwardly from the nipple and the upper end of the pipe receives a tube 9 which is slidable within a collar 10 of supporting frame 11. The tube 9 can be locked in position with respect to the collar 10 and frame 11 by a set screw 12 which extends through an opening in the collar and engages the outer surface of the tube 9.

The upper end of the tube 9 defines a valve seat, and the valve seat is enclosed by a valve cap 13 which is pivotally connected between a pair of brackets 14 by a pin 15. As shown in FIG. 4, the brackets 14 are secured to opposite positions of a generally circular collar 16 which is clamped to the upper end of the tube 9 by a screw 17.

Located on the undersurface of the valve cap 13 is a sealing disk 18 which is adapted to engage the upper end of the tube 9 when the valve cap is in the closed position to seal the tube 9 and prevent air from entering the pipeline.

Extending outwardly from the valve cap 13 is an arm or lever 19 which is secured to the valve by a screw 20. The outer portion of the arm 19 is adapted to ride on the outer surface of an eccentric or cam 21 which is mounted eccentrically on shaft 22 of gear reduction unit 23. The gear reduction unit 23 is mounted on a vertical mounting plate 24 and is driven by a motor 25. The motor 25 is normally tied in or programmed with the automatic washing mechanism so that when the washing cycle is started, the motor 25 will be operated.

After the milking operation has been completed, one or more hoses 6 of the individual milkers are connected to nipples 4 of the manifold. The automatic washing mechanism is then actuated and the vacuum pump is energized to thereby draw the washing solution into the pipeline 1 through the hoses 6 from the wash tank. Actuation of the automatic washing mechanism also acts to operate motor 25 to rotate the eccentric 21 and raise and lower the valve cap 13. Each time the valve cap is raised, a slug of air is drawn into the pipeline, and the sudden entrance of air into the vacuum system creates turbulence in the washing solution passing through the pipeline, thereby increasing the relative velocity of the solution and providing a more effective cleaning action within the pipeline.

With a constant speed motor, the frequency of the opening and closing of the valve cap 13 will be uniform. However, the frequency can be changed by changing the speed of the motor or by changing the shape of the eccentric or cam 21. However, with the use of a constant speed motor, the amount of air which enters the pipeline can be regulated by the vertical adjustment of tube 9 with respect to the eccentric 21. The vertical adjustment of the tube regulates the relative proportion of open and closed time for each cycle, and this, in effect, varies the amount of air which is drawn into the pipeline. This adjustment is important to the dairyman, because it enables the dairyman to readily adjust the amount of air introduced into the pipeline depending on the capacity of the vacuum pump being used, the length of the pipeline and other factors, in order to obtain the optimum cleaning action for the individual milking system.

While the drawings illustrate the air injector 7 as being connected to the manifold 2, it is contemplated that the air injector can be connected to the pipeline 1 at any location between the wash tank and the high point of the pipeline in the barn or other area of installation.

The air injector can be connected to the pipeline at all times, or it can be removed during the milking operation. If the air injector is connected to the pipeline during the milking cycle, the valve cap 13 will be closed by the vacuum in the system so that air will not be drawn into the pipeline and there will be no interference with the normal milking operation. However, if desired, the air injector can be removed after the washing operation and reinstalled again after the milking operation has been completed.

Various modes of carrying out the invention are contemplated as being within the scope of the following claims particularly pointing out and distinctly claiming the subject matter which is regarded as the invention.

I claim:

1. In a pipeline milking system, a pipeline to contain a washing liquid, means for conveying said liquid through said pipeline, a tube having one end connected to the pipeline and the opposite end defining a valve seat, a valve member hinged to the tube and engageable with said valve seat, an arm extending outwardly from said valve member, a supporting structure, eccentric means mounted on said supporting structure, drive means for driving said eccentric means, said arm disposed in engagement with said eccentric means and disposed to pivot said valve member as said eccentric is driven to thereby open and close said valve member with air being drawn into the pipeline when said valve member is open, and means for adjusting said tube axially with respect to said supporting structure to thereby vary the relative proportion of open and closed time of said valve means for each cycle.

2. The structure of claim 1, wherein said means for conveying said liquid comprises a source of vacuum connected to said pipeline.

3. In a pipeline milking system, a pipeline to contain a washing liquid, means for conveying said liquid through said pipeline, a tube connected to the pipeline and having a portion defining a valve seat, valve means engageable with said valve seat, cam means operably connected to the valve means for opening and closing said valve means, means to drive said cam means to thereby alternately open and close said valve means with air being introduced into said pipeline when the valve means is open, and adjusting means for selectively varying the length of time the valve means is open with respect to the length of time that the valve means is closed to thereby regulate the proportion of air introduced into said pipeline, a supporting structure, said cam means being mounted on said supporting structure, said adjusting means comprising a mechanism for adjusting said tube axially with respect to the supporting structure to thereby vary the relative position of said valve seat with respect to said cam means.

References Cited

UNITED STATES PATENTS

| | | | |
|---|---|---|---|
| 2,781,050 | 2/1957 | Edwards | 137—119 |
| 1,403,517 | 1/1922 | Miller | 251—299 XR |
| 1,849,274 | 3/1932 | Brown | 137—624.13 XR |
| 2,121,707 | 6/1938 | McGee | 251—299 XR |
| 2,415,466 | 2/1947 | Curtis | 251—303 XR |
| 2,881,786 | 3/1959 | Ogle et al. | 137—624.18 XR |
| 2,989,034 | 6/1961 | Puster | 137—82 XR |
| 3,139,107 | 6/1964 | Bender | 119—14.06 XR |

ROBERT G. NILSON, Primary Examiner

U.S. Cl. X.R.

119—14.18; 251—251, 299